United States Patent
Lee et al.

(10) Patent No.: US 12,112,575 B2
(45) Date of Patent: *Oct. 8, 2024

(54) METHOD AND APPARATUS FOR DETECTING LIVENESS BASED ON PHASE DIFFERENCE

(71) Applicant: SAMSUNG ELECTRONICS CO., LTD., Suwon-si (KR)

(72) Inventors: Solae Lee, Suwon-si (KR); Youngjun Kwak, Seoul (KR); Sungheon Park, Suwon-si (KR); Byung In Yoo, Seoul (KR); Yong-Il Lee, Daejeon (KR); Hana Lee, Suwon-si (KR); Jiho Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 343 days.

This patent is subject to a terminal disclaimer.

(21) Appl. No.: 17/570,711

(22) Filed: Jan. 7, 2022

(65) Prior Publication Data

US 2022/0130175 A1     Apr. 28, 2022

Related U.S. Application Data

(63) Continuation of application No. 17/017,118, filed on Sep. 10, 2020, now Pat. No. 11,244,181.

(30) Foreign Application Priority Data

Feb. 25, 2020  (KR) .................. 10-2020-0022858

(51) Int. Cl.
*G06V 40/40*     (2022.01)
*G06F 18/21*     (2023.01)
(Continued)

(52) U.S. Cl.
CPC .............. *G06V 40/45* (2022.01); *G06F 18/21* (2023.01); *G06F 18/25* (2023.01); *G06T 7/97* (2017.01);
(Continued)

(58) Field of Classification Search
CPC .... G06V 40/45; G06V 10/764; G06V 10/809; G06T 7/97; G06T 2207/20084; G06T 2207/20132
See application file for complete search history.

(56) References Cited

U.S. PATENT DOCUMENTS 10,043,290 B2 *  8/2018  Hayasaka ................ G06T 7/97
10,410,368 B1 *  9/2019  Galor Gluskin ..... H04N 25/704
(Continued)

FOREIGN PATENT DOCUMENTS

CN      110765923 A        2/2020
JP      WO2007/029446 A1   3/2007
(Continued)

OTHER PUBLICATIONS

Ghiani, Luca, et al. "Fingerprint Liveness Detection by Local Phase Quantization" 21st International Conference on Pattern Recognition (ICPR 2012), Nov. 11-15, 2012. Tsukuba, Japan (pp. 537-540).
(Continued)

*Primary Examiner* — Ming Y Hon
(74) *Attorney, Agent, or Firm* — NSIP Law

(57) ABSTRACT

A method and apparatus for detecting a liveness based on a phase difference are provided. The method includes generating a first phase image based on first visual information of a first phase, generating a second phase image based on second visual information of a second phase, generating a minimum map based on a disparity between the first phase image and the second phase image, and detecting a liveness based on the minimum map.

20 Claims, 10 Drawing Sheets

(51) Int. Cl.
  *G06F 18/25* (2023.01)
  *G06T 7/00* (2017.01)
  *G06V 10/147* (2022.01)
  *G06V 10/50* (2022.01)
  *G06V 10/764* (2022.01)
  *G06V 10/80* (2022.01)
  *G06V 10/82* (2022.01)

(52) U.S. Cl.
  CPC ............ *G06V 10/147* (2022.01); *G06V 10/50* (2022.01); *G06V 10/764* (2022.01); *G06V 10/809* (2022.01); *G06V 10/82* (2022.01); *G06T 2207/20084* (2013.01); *G06T 2207/20132* (2013.01)

(56) References Cited

U.S. PATENT DOCUMENTS

| | | | |
|---|---|---|---|
| 10,410,374 | B2* | 9/2019 | Du .................. H04N 17/002 |
| 10,708,487 | B2* | 7/2020 | Liu .................. H04N 23/672 |
| 11,244,181 | B2* | 2/2022 | Lee .................. G06F 18/254 |
| 2005/0045773 | A1 | 3/2005 | Bank et al. |
| 2011/0064987 | A1 | 3/2011 | Ogasawara et al. |
| 2012/0075492 | A1 | 3/2012 | Nanu et al. |
| 2013/0176445 | A1* | 7/2013 | Streeter ............... G01S 17/36 348/208.1 |
| 2013/0188840 | A1* | 7/2013 | Ma ..................... G06V 40/45 382/107 |
| 2013/0240710 | A1* | 9/2013 | Choi ................ H01L 27/14625 250/208.1 |
| 2016/0037152 | A1* | 2/2016 | Kim .................. H04N 13/25 348/47 |
| 2016/0239974 | A1 | 8/2016 | Wang |
| 2018/0122167 | A1 | 5/2018 | Maggioni |
| 2018/0239955 | A1 | 8/2018 | Rodriguez et al. |
| 2019/0068872 | A1 | 2/2019 | Wang et al. |
| 2019/0208118 | A1 | 7/2019 | Jasinski |
| 2019/0266388 | A1 | 8/2019 | Kolagunda et al. |
| 2020/0104034 | A1* | 4/2020 | Lee .................. H04N 23/67 |

FOREIGN PATENT DOCUMENTS

| | | |
|---|---|---|
| KR | 10-1415287 B1 | 7/2014 |
| KR | 10-2017-0051392 A | 5/2017 |
| KR | 10-2017-0067634 A | 6/2017 |

OTHER PUBLICATIONS

Gragnaniello, Diego, et al. "Local contrast phase descriptor for fingerprint liveness detection" *Department of Electrical Engineering and Information Technology*, University Federico II of Naples, Italy, May 28, 2014 (9 pages in English).

Liu, Yaojie et al. "Learning Deep Models for Face Anti-Spoofing: Binary or Auxiliary Supervision", *Department of Computer Science and Engineering*, Michigan State University, East Lansing, MI 48824, Mar. 29, 2018, IEEE Conference on Computer Vision and Pattern Recognition, pp. 389-398.

Extended European search report issued on Aug. 31, 2021 in counterpart European Patent Application No. 21151150.6 (13 pages in English).

* cited by examiner

| 1 | 2 | 1 | 2 | ... | 1 | 2 |
|---|---|---|---|-----|---|---|
| 3 | 4 | 3 | 4 | ... | 3 | 4 |
| 1 | 2 | 1 | 2 | ... | 1 | 2 |
| ⋮ |   |   |   |     |   | ⋮ |
|   |   |   |   |     |   |   |
| 3 | 4 | 3 | 4 | ... | 3 | 4 |

Image sensor 210

METHOD AND APPARATUS FOR DETECTING LIVENESS BASED ON PHASE DIFFERENCE

CROSS-REFERENCE TO RELATED APPLICATIONS

This application is a continuation of U.S. application Ser. No. 17/017,118 filed on Sep. 10, 2020, which claims the benefit under 35 USC § 119(a) of Korean Patent Application No. 10-2020-0022858, filed on Feb. 25, 2020, in the Korean Intellectual Property Office, the entire disclosures of which are incorporated herein by reference for all purposes.

BACKGROUND

1. Field

The following description relates to a method and apparatus for detecting a liveness based on a phase difference.

2. Description of Related Art

Biometric authentication technology is used to authenticate a user based on, for example, a fingerprint, an iris, voice, a face or a blood vessel. Such biological characteristics used for the authentication differ from individual to individual, rarely change during a lifetime, and have a low risk of being stolen or imitated. In addition, individuals do not need to intentionally carry such characteristics at all times. Face verification technology, which is a type of biometric authentication technology, is authentication technology of determining whether a user is a valid user based on a face appearing in a still image or a moving image. The face verification technology may identify a target person to be authenticated without physical contact with the target person. Recently, due to a convenience and efficiency of the face verification technology, the face verification technology is being widely used in various application fields, for example, a security system, a mobile verification or multimedia data search.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a liveness detection method based on a phase difference includes generating a first phase image based on first visual information of a first phase sensed by a first pixel group of an image sensor, generating a second phase image based on second visual information of a second phase sensed by a second pixel group of the image sensor, generating a minimum map based on a disparity between the first phase image and the second phase image, and detecting a liveness based on the minimum map.

The generating of the minimum map may include setting a first base region in the first phase image, setting a second base region corresponding to the first base region in the second phase image, setting at least one shifted region by shifting the second base region by a reference shift value, generating difference images based on a difference between an image of the first base region and an image of the second base region and a difference between the image of the first base region and at least one image of the at least one shifted region, and generating the minimum map based on the difference images.

The generating of the minimum map based on the difference images may include selecting a minimum value among corresponding difference values at positions that correspond to each other in the difference images, and determining a pixel value of the minimum map based on the minimum value. The pixel value of the minimum map may correspond to the minimum value or correspond to an index of a difference image including the minimum value among the difference images.

The detecting of the liveness may include inputting input data including at least one patch that is based on the minimum map to the at least one liveness detection model, and detecting the liveness based on an output of the at least one liveness detection model. The at least one liveness detection model may include at least one neural network, and the at least one neural network may be pre-trained to detect a liveness of an object in input data.

The liveness detection method may further include generating a reference image by concatenating the first phase image, the second phase image and the minimum map. The detecting of the liveness may further include generating the at least one patch by cropping the reference image based on a region of interest (ROI). The at least one patch may include a plurality of patches with different characteristics of the object. The at least one liveness detection model may include a plurality of liveness detection models that process input data including the plurality of patches. The detecting of the liveness based on the output of the at least one liveness detection model may include detecting the liveness by fusing outputs of the plurality of liveness detection models in response to an input of the input data.

The liveness detection method may further include generating a reference image by concatenating the first phase image, the second phase image and the minimum map. The detecting of the liveness may include detecting the liveness based on the reference image. The liveness detection method may further include performing preprocessing of the first phase image and the second phase image. The performing of the preprocessing may include applying any one or any combination of downsizing, lens shading correction, gamma correction, histogram matching, and denoising to the first phase image and the second phase image.

A first pixel of the first pixel group and a second pixel of the second pixel group may be located adjacent to each other. The liveness detection method may further include generating a third phase image based on third visual information of a third phase sensed by a third pixel group of the image sensor; and generating a fourth phase image based on fourth visual information of a fourth phase sensed by a fourth pixel group of the image sensor. When the minimum map is generated, a disparity between the first phase image and the third phase image and a disparity between the first phase image and the fourth phase image may be further used.

In another general aspect, a liveness detection apparatus based on a phase difference includes a processor, and a memory including instructions executable by the processor, wherein in response to the instructions being executed by the processor, the processor is configured to generate a first phase image based on first visual information of a first phase sensed by a first pixel group of an image sensor, to generate a second phase image based on second visual information of a second phase sensed by a second pixel group of the image sensor, to generate a minimum map based on a disparity between the first phase image and the second phase image, and to detect a liveness based on the minimum map.

In another general aspect, an electronic apparatus includes an image sensor configured to sense first visual information of a first phase using a first pixel group and to sense second visual information of a second phase using a second pixel group, and a processor configured to generate a first phase image based on the first visual information, to generate a second phase image based on the second visual information, to generate a minimum map based on a disparity between the first phase image and the second phase image, and to detect a liveness based on the minimum map.

In another general aspect, a electronic liveness detection apparatus based on a phase difference, the liveness detection apparatus includes a multiphase detection sensor configured to generate a first phase image by sensing first visual information of a first phase using a first pixel group and to generate a second phase image by sensing second visual information of a second phase using a second pixel group, a multiphase patch generator configured to generate a minimum map based on a disparity between the first phase image and the second phase image, and a liveness detector configured to detect a liveness based on the minimum map.

Other features and aspects will be apparent from the following detailed description, the drawings, and the claims.

Figure 1:
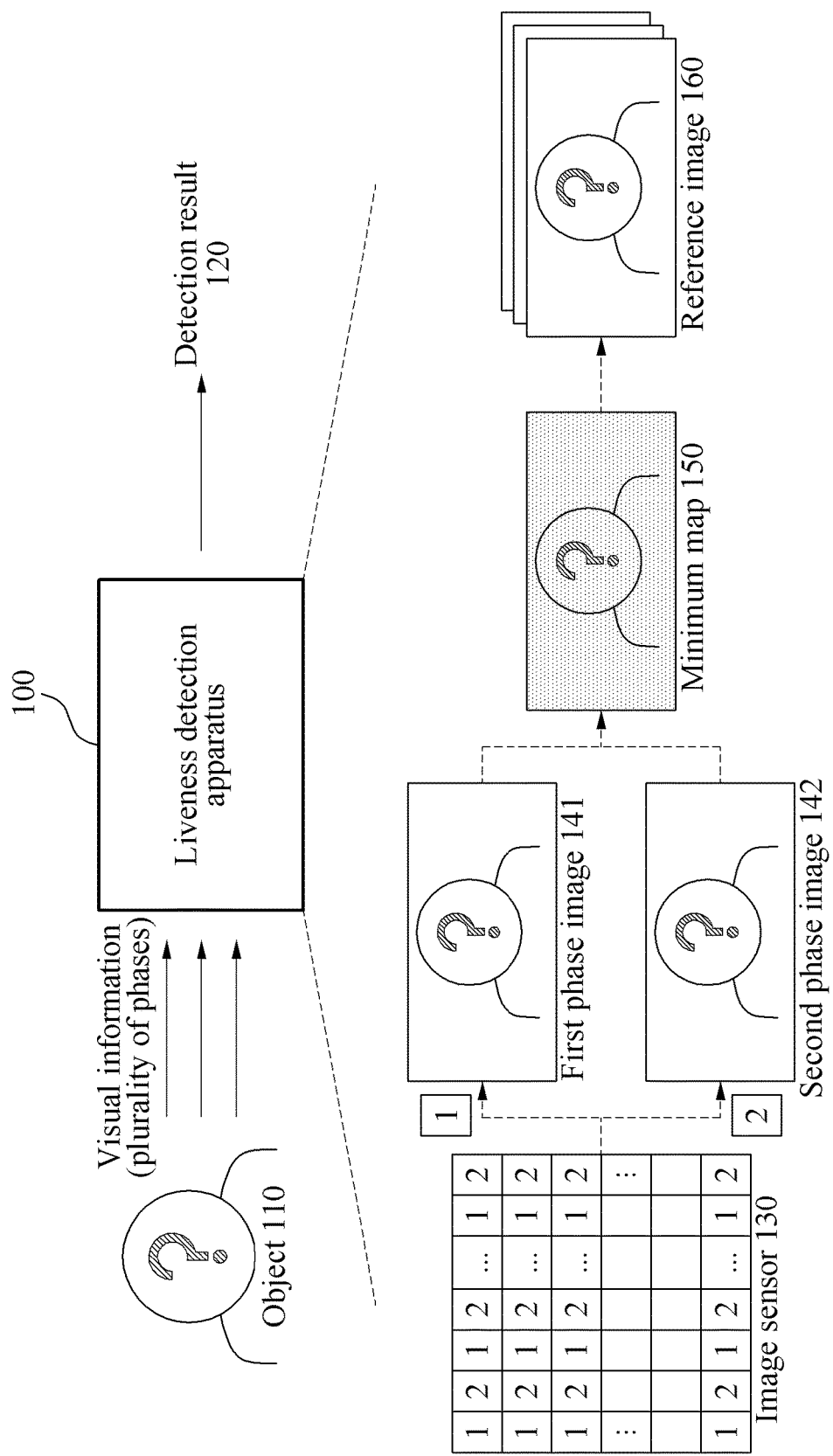
FIG. 1 illustrates an example of an operation of a liveness detection apparatus.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The following specific structural or functional descriptions are exemplary to merely describe the examples, and the scope of the examples are not limited to the descriptions provided in the present specification. Various changes and modifications can be made thereto by those of ordinary skill in the art.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the disclosure.

As used herein, the singular forms are intended to include the plural forms as well, unless the context clearly indicates otherwise. It should be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood by one of ordinary skill in the art. Terms defined in dictionaries generally used should be construed to have meanings matching with contextual meanings in the related art and are not to be construed as an ideal or excessively formal meaning unless otherwise defined herein.

Hereinafter, examples will be described in detail with reference to the accompanying drawings, wherein like reference numerals refer to the like elements throughout.

FIG. 1 illustrates an example of an operation of a liveness detection apparatus 100. Referring to FIG. 1, the liveness detection apparatus 100 generates, based on visual information of an object 110, a detection result 120. The detection result 120 may include information about a liveness. For example, the detection result 120 may indicate whether the object 110 corresponds to a real user or corresponds to an attacker such as an image acquired by capturing a user. The detection result 120 may be used in image-based biometric authentication, for example, face verification or iris authentication.

The visual information of the object 110 may be expressed through a plurality of phases. An image sensor 130 may sense visual information of the plurality of phases and may generate sensor data associated with visual information of each of the phases. The image sensor 130 may correspond to a multiphase detection sensor. For example, the image sensor 130 may be a two phase detection (2PD) sensor for sensing two types of phases, or a quadrature phase detection (QPD) sensor for sensing four types of phases. However, a number of phases sensed by the image sensor 130 is not limited thereto, and the image sensor 130 may sense various numbers of phases. The image sensor 130 corresponds to a 2PD sensor as shown in FIG. 1, and examples in which the image sensor 130 corresponds to a 2PD sensor will be described below. However, this is only for convenience of description, the following description is also applicable to an example in which the image sensor 130 corresponds to another multiphase detection sensor such as a QPD sensor.

A plurality of pixels included in the image sensor 130 may belong to one of a first group 1 and a second group 2. First pixels of the first group 1 may sense first visual information of a first phase and generate first sensor data, and second pixels of the second group 2 may sense second visual information of a second phase and generate second sensor data. A first pixel and a second pixel may be located adjacent to each other. The first pixel and the second pixel located adjacent to each other may indicate any one or any combination of an example in which there is no pixel between the first pixel and the second pixel in a direction in which phase characteristics are distinguished, an example in which the first pixels are not consecutively arranged, and an example in which the second pixels are not consecutively arranged. Distinguishing of phase characteristics will be further described below with reference to FIG. 5.

Figures 2, 3:
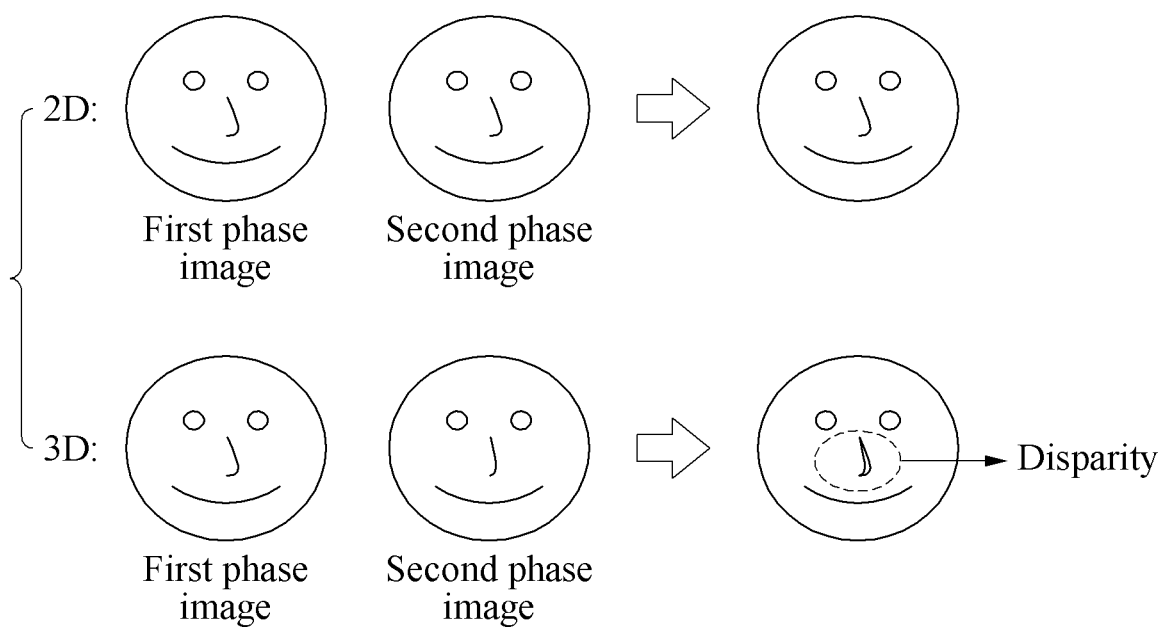
FIG. 2 illustrates an example of a quadrature phase detection (QPD) image sensor.
FIG. 3 illustrates an example of a difference between two-dimensional (2D) object and a three-dimensional (3D) object that may be detected based on phase images.

FIG. 2 illustrates an example of a QPD image sensor. Referring to FIG. 2, an image sensor 210 may sense four types of phases in a form of a grid by distinguishing the phases. For example, in the image sensor 210, first pixels of a first group 1 may sense first visual information of a first phase, second pixels of a second group 2 may sense second visual information of a second phase, third pixels of a third group 3 may sense third visual information of a third phase, and fourth pixels of a fourth group 4 may sense fourth visual information of a fourth phase.

Referring back to FIG. 1, the liveness detection apparatus 100 may generate a first phase image 141 based on the first sensor data, and may generate a second phase image 142 based on the second sensor data. Due to a feature of the image sensor 130, a disparity between the first phase image 141 and the second phase image 142 may be present, and the disparity may be used to detect the liveness of the object 110. For example, FIG. 3 illustrates an example of a difference between two-dimensional (2D) object and a three-dimensional (3D) object that may be detected based on phase images. When the 2D object is captured, a disparity may not be detected based on a first phase image and a second phase image. When the 3D object is captured, a disparity may be detected based on a first phase image and a second phase image. For example, a disparity may be detected from a stereoscopic structure, for example, a nose of a user.

The liveness detection apparatus 100 may generate a minimum map 150 and a reference image 160 based on the first phase image 141 and the second phase image 142, and may detect the liveness of the object 110 based on the minimum map 150 and the reference image. When the object 110 corresponds to a real user, a disparity corresponding to a difference between the first phase image 141 and the second phase image 142 may be present. Due to a structural characteristic of the image sensor 130 having a narrow gap between the first pixel of the first group 1 and the second pixel of the second group 2, the disparity may not be relatively great. The liveness detection apparatus 100 may analyze the above fine disparity based on the minimum map 150 and the reference image, and may effectively detect the liveness of the object 110 based on an analysis result.

The liveness detection apparatus 100 may shift at least one time one of the first phase image 141 and the second phase image 142 in a state of fixing the other one, and may generate the minimum map 150 based on a difference between the fixed image and the shifted image. For example, the liveness detection apparatus 100 may set a first base region in the first phase image 141, may set a second base region corresponding to the first base region in the second phase image 142, and may generate at least one shifted region by shifting the second base region by a reference shift value. The liveness detection apparatus 100 may generate difference images based on a difference between an image of the first base region and an image of the second base region and a difference between the image of the first base region and an image of the at least one shifted region.

The liveness detection apparatus 100 may generate the minimum map 150 based on the difference images. For example, the liveness detection apparatus 100 may select a minimum value among corresponding difference values that are located at coordinates and that correspond to each other in the difference images, and may determine a pixel value of the minimum map 150 based on the minimum value. Based on the above scheme, each pixel value of the minimum map 150 may be determined. A pixel value of the minimum map 150 may correspond to a minimum value, or an index of a difference image including a minimum value among the difference images. The minimum map 150 may include minimum values or indices.

The liveness detection apparatus 100 may generate the reference image 160 by combining the first phase image 141, the second phase image 142 and the minimum map 150, and may detect the liveness of the object 110 based on the reference image 160. For example, the liveness detection apparatus 100 may generate the reference image 160 by concatenating the first phase image 141, the second phase image 142 and the minimum map 150, and may detect the liveness of the object 110 based on the reference image 160.

The liveness detection apparatus 100 may detect the liveness of the object 110 using at least one liveness detection model. Each liveness detection model may include at least one neural network. The liveness detection apparatus 100 may generate input data of a liveness detection model based on the reference image 160, may input the input data to the liveness detection model, and may detect the liveness of the object 110 based on output data of the liveness detection model. At least a portion of the neural network may be implemented as software, hardware including a neural processor, or a combination of software and hardware.

For example, the neural network may correspond to a deep neural network (DNN), for example, a fully connected network, a deep convolutional neural network (CNN), or a recurrent neural network (RNN). The DNN may include a plurality of layers. The plurality of layers may include an input layer, at least one hidden layer, and an output layer.

The neural network may be trained to perform a given operation by mapping input data and output data that are in a nonlinear relationship based on deep learning. The deep learning may be a machine learning scheme for solving a given issue from a big data set. The deep learning may be understood as a process of solving an optimization issue by searching for a point at which energy is minimized while training a neural network based on prepared training data. Through supervised or unsupervised learning of the deep learning, a structure of the neural network or a weight corresponding to a model may be obtained, and input data and output data may be mapped to each other through the weight.

The neural network may be trained based on training data in a training process, and may perform an inference operation, for example, classification, recognition or detection of input data in an inference process. The neural network of the liveness detection model may be pre-trained to detect a liveness of an object in input data. The term "pre-" indicates a state before the neural network is "started". The "started" neural network indicates that the neural network may be ready for inference. For example, "start" of the neural network may include loading of the neural network in a memory, or an input of input data for inference to the neural network after the neural network is loaded in a memory.

Figure 4:
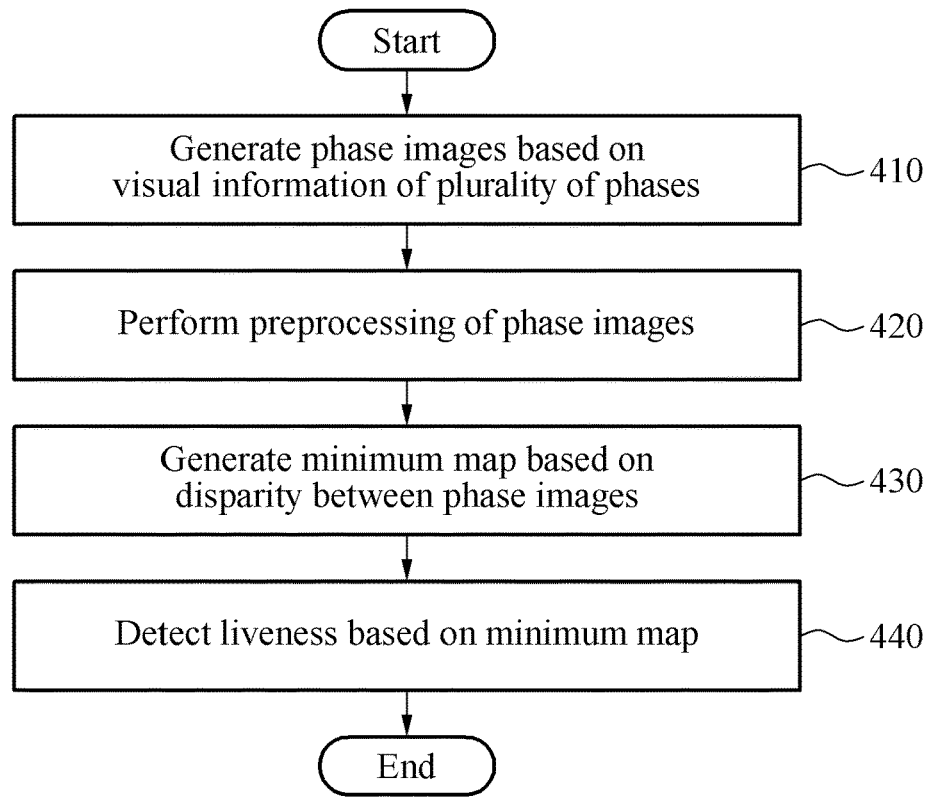
FIG. 4 illustrates an example of a method of detecting a liveness based on a phase difference.

FIG. 4 illustrates an example of a method of detecting a liveness based on a phase difference. Referring to FIG. 4, in operation 410, a liveness detection apparatus generates phase images based on visual information of a plurality of phases. For example, the liveness detection apparatus may receive sensor data from pixel groups that sense visual information of different phases and may generate the phase images based on the sensor data. Hereinafter, an example in which the phase images typically include a first phase image and a second phase image will be typically described.

In operation 420, the liveness detection apparatus performs preprocessing of the phase images. When a liveness is detected from a 2D image, preprocessing such as distortion correction is generally performed. However, in preprocessing according to examples, preprocessing such as distortion correction may not be performed. This is because a shape of an object may desirably be preserved to detect a fine disparity, but preprocessing such as distortion correction may change the shape of the object. In an example, instead of the distortion correction, preprocessing including any one or any combination of downsizing, lens shading correction, gamma correction, histogram matching, and denoising may be performed. In another example, preprocessing may not be performed.

In an example, the liveness detection apparatus may apply downsizing to the phase images and may perform preprocessing such as lens shading correction of the phase images to which the downsizing is applied. Through the downsizing, a computation amount may be reduced. For example, the downsizing may be performed in a direction in which phase characteristics are not distinguished. Since information associated with a disparity is mainly included in a direction in which phase characteristics are distinguished, a loss of information may be minimized in a downsizing process. Also, noise may be removed through preprocessing such as lens shading correction or gamma correction, and accordingly an accuracy of image information may be enhanced. Hereinafter, examples of a downsizing operation will be further described with reference to FIG. 5.

Figure 5:
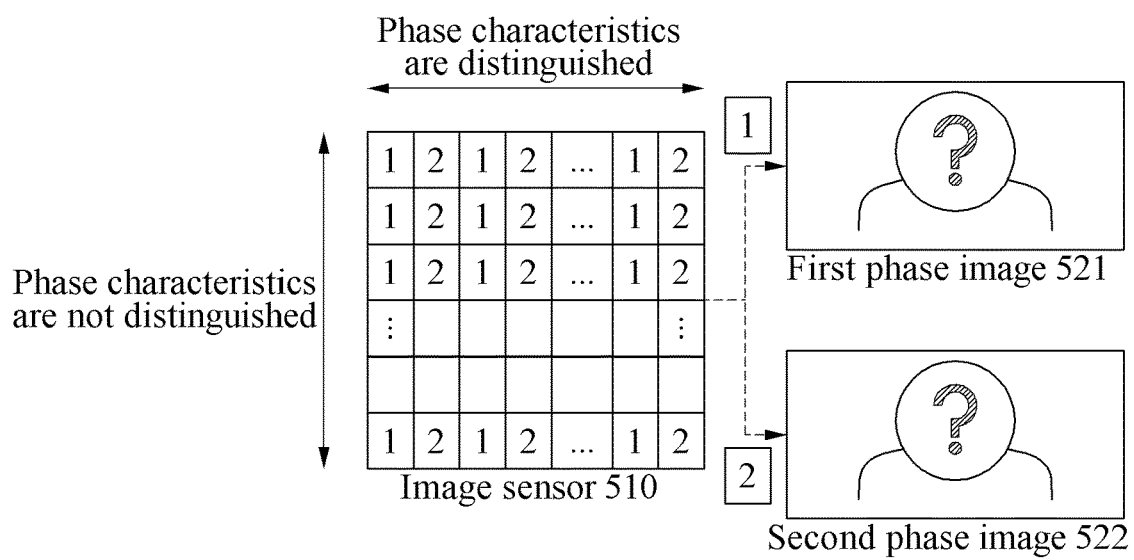
FIG. 5 illustrates an example of phase characteristics in each direction in an input image.

FIG. 5 illustrates an example of phase characteristics in each direction in an input image. Referring to FIG. 5, pixels of a first group 1 and pixels of a second group 2 are alternately arranged in a horizontal direction of an image sensor 510. Accordingly, phase characteristics may be regarded to be reflected in the horizontal direction. In other words, the phase characteristics may be distinguished based on pixel values in the horizontal direction. Since the image sensor 510 corresponds to a 2PD sensor, the phase characteristics are not distinguished in a vertical direction. Thus, to maintain the phase characteristics, a liveness detection apparatus may perform downsizing in a direction in which phase characteristics are not distinguished. For example, the liveness detection apparatus may downsize each of a first phase image 521 and a second phase image 522 in the vertical direction.

In this example, the liveness detection apparatus may remove sensing data of a predetermined row based on a predetermined downsizing ratio, or may perform statistical processing (for example, averaging) of sensing data of a plurality of rows based on a predetermined downsizing ratio, to perform downsizing. For example, the liveness detection apparatus may perform averaging of sensor data of a first row and sensor data of a second row adjacent to the first row for each column and may downsize a phase image to ½.

Referring back to FIG. 4, in operation 430, the liveness detection apparatus generates a minimum map based on a disparity between the phase images. As described above, the liveness detection apparatus may shift at least one time one of the first phase image and the second phase image in a state of fixing the other one, and may generate a minimum map based on a difference between the fixed image and the shifted image. Examples of generating a minimum map will be further described below with reference to FIGS. 6, 7A and 7B.

In operation 440, the liveness detection apparatus detects a liveness based on the minimum map. In an example, the liveness detection apparatus may generate a reference image by combining the phase images and the minimum map, may input input data corresponding to the reference image to a liveness detection model, and may detect the liveness based on output data of the liveness detection model. For example, the liveness detection apparatus may generate at least one patch by cropping the reference image based on a region of interest (ROI), and input data of a detection model may be generated based on the at least one patch. Examples of detecting a liveness will be further described below with reference to FIG. 8.

Figure 6:
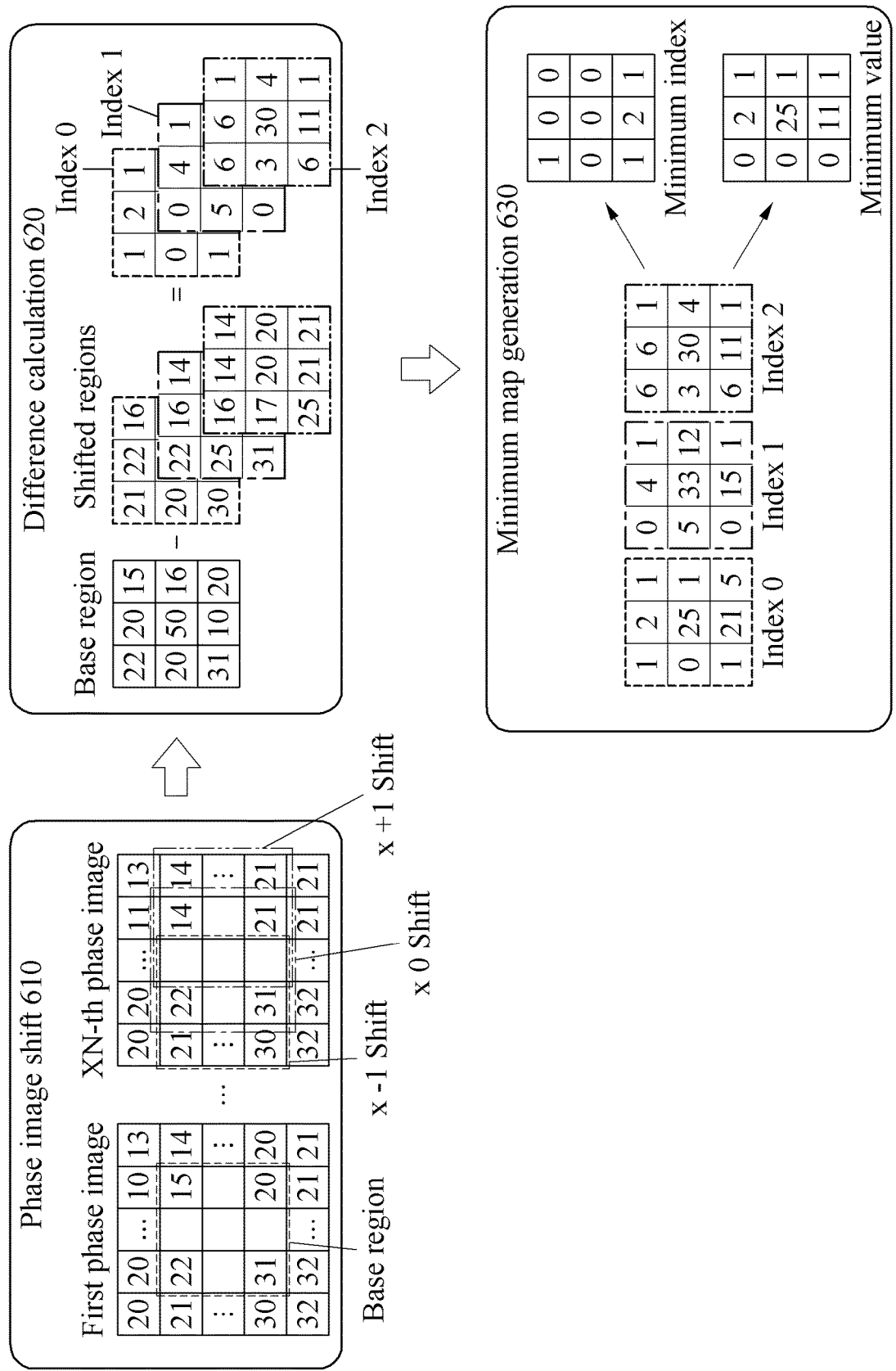
FIG. 6 illustrates an example of generating a minimum map.

FIG. 6 illustrates an example of generating a minimum map. Referring to FIG. 6, in operation 610, a liveness detection apparatus performs a phase image shift. As described above, the liveness detection apparatus may shift at least one time one of a first phase image and a second phase image in a state of fixing the other one. FIG. 6 illustrates an example in which the first phase image is fixed and an XN-th phase image is shifted. In FIG. 6, a numerical number in each pixel of each phase image represents a pixel value.

In XN, X indicates that phase characteristics are distinguished in a horizontal direction, and N represents a number of phases. For example, when a first phase image and a second phase image generated by a 2PD sensor are used, the second phase image may be represented as an X2-th phase image. Hereinafter, an example in which the XN-th phase image corresponds to the second phase image is described. The liveness detection apparatus may set a base region in the first phase image and may set at least one shifted region in the second phase image. For example, the liveness detection apparatus may set shifted regions of x−1, x0 and x+1 in the second phase image. In this example, x0 represents a base region in which shift is not performed.

The base region of the first phase image may be referred to as a "first base region", the base region of the second phase image may be referred to as a "second base region", and the first base region and the second base region may correspond to each other in a position. In "x−1" and "x+1", − and + represent shift directions and "1" represents a reference shift value. A base region may be set based on the reference shift value. When the reference shift value is "r", a shifted region may be set by shifting the base region by "r" in a predetermined direction. Thus, the base region may be set in a range enabling an available space for shift to be secured.

The liveness detection apparatus may set at least one shifted region (for example, the shifted region of x−1 and the shifted region of x+1) by shifting the second base region (for example, the shifted region of x0) by the reference shift value (for example, "1") in a shift direction. The reference shift value may be set to various values, and a number of shifted regions corresponding to the reference shift value may be set. For example, the number of shifted regions may be determined based on the reference shift value and a number of shift directions.

In an example, when the reference shift value is "1" and when the number of shift directions is "2" that indicates left and right directions, the number of shifted regions may be "2×1+1=3". In this example, the three shifted regions may include shifted regions of x−1, x0 and x+1. In another example, when the reference shift value is "5" and when the number of shift directions is "2" that indicates left and right directions, the number of shifted regions may be "2×5+1=11". In this example, the 11 shifted regions may include shifted regions of x−5 through x−1, x0, and x+1 through x+5. In still another example, when the reference shift value is "1" and when the number of shift directions is "4" that indicates left, right, up, and down directions, the number of shifted regions may be "2×1+2×1+1=5". In this example, the five shifted regions may include shifted regions of x−1, y−1, xy0, x+1, and y+1.

Figure 7A:
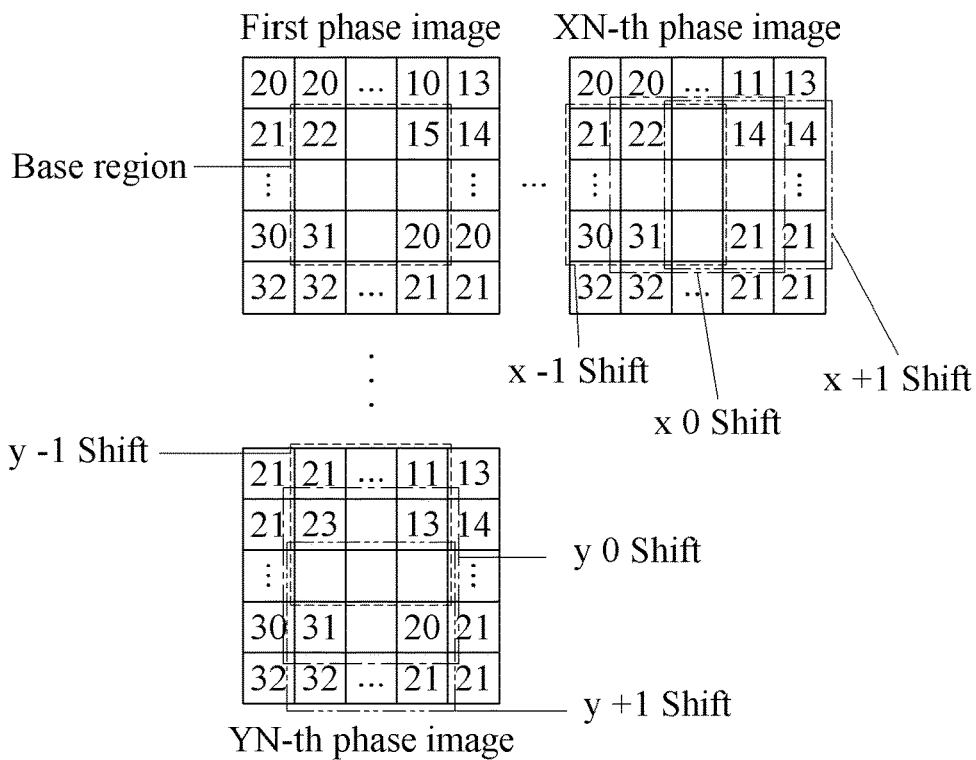
FIGS. 7A and 7B illustrate examples of shifting a phase image.

When a multiphase detection sensor such as a QPD sensor is used, phase characteristics may be distinguished in directions other than the horizontal direction. In an example, as shown in FIG. 7A, the liveness detection apparatus may shift phase images in a horizontal direction and a vertical direction of a QPD sensor and may determine shifted regions of each phase image. In an XN-th phase image, shifted regions (for example, shifted regions of x−1, x0 and x+1) may be determined through shift in the horizontal direction, similarly to operation 610 of FIG. 6. In a YN-th phase image, shifted regions (for example, shifted regions of y−1, y0 and y+1) may be determined through shift in the vertical direction.

In XN and YN, X indicates that phase characteristics are distinguished in the horizontal direction, and Y indicates that phase characteristics are distinguished in the vertical direction. Also, N represents a number of phases. Although the same number of phases are used in the vertical direction and the horizontal direction as described above, a number of phases used in the vertical direction and a number of phases used in the horizontal direction may be different from each other. For example, N may be determined based on a number of phases that may be distinguished by a sensor. In an example of a QPD sensor, N may be "2" and a first phase image, an X2-th phase image, and a Y2-th phase image may be present in the example of FIG. 7A.

Figure 7B:
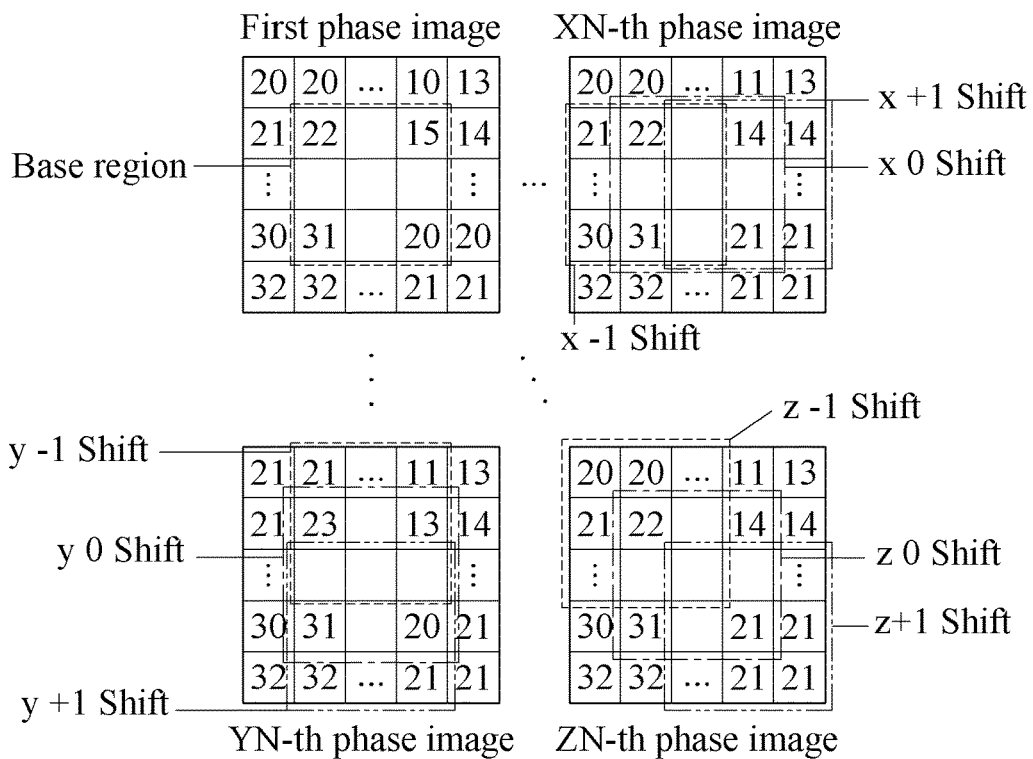

In another example, as shown in FIG. 7B, the liveness detection apparatus may shift phase images in a horizontal direction, a vertical direction, and a diagonal direction of a QPD sensor and may determine shifted regions of each phase image. In an XN-th phase image, shifted regions (for example, shifted regions of x−1, x0 and x+1) may be determined through shift in the horizontal direction. In a YN-th phase image, shifted regions (for example, shifted regions of y−1, y0 and y+1) may be determined through shift in the vertical direction. In a ZN-th phase image, shifted regions (for example, shifted regions of z−1, z0 and z+1) may be determined through shift in the diagonal direction. In ZN, Z indicates that phase characteristics are distinguished in the diagonal direction, and N represents a number of phases. For example, when N is "2", a first phase image, an X2-th phase image, a Y2-th phase image and a Z2-th phase image may be used in the example of FIG. 7B.

When shifted regions are determined as described above, a difference between an image of the base region and an image of each of the shifted regions may be calculated in operation 620. The liveness detection apparatus may generate difference images based on a difference between a fixed image (for example, an image of the first base region) and a shifted image (for example, an image of a shifted region), and may generate a minimum map based on the difference images. For example, the liveness detection apparatus may generate a first difference image based on a difference between the image of the first base region and an image of the shifted region of x−1, may generate a second difference image based on a difference between the image of the first base region and an image of the shifted region of x0, and may generate a third difference image based on a difference between the image of the first base region and an image of the shifted region of x+1.

The liveness detection apparatus may assign an index value to each difference image. For example, the liveness detection apparatus may assign index values in an order of x−1, x0 and x+1. As shown in FIG. 6, an index value of "0" is assigned to the first difference image, an index value of "1" is assigned to the second difference image, and an index value of "2" is assigned to the third difference image. Index values may be assigned in various orders.

A difference image set including the above difference images may be generated for each phase image. For example, in the example of FIG. 7A, a difference image set of the XN-th phase image and a difference image set of the YN-th phase image may be generated. In the example of FIG. 7B, a difference image set of each of the XN-th phase image, the YN-th phase image, and the ZN-th phase image may be generated.

In operation 630, the liveness detection apparatus generates a minimum map. The liveness detection apparatus may select a minimum value among corresponding difference values at positions corresponding to each other in difference images of a difference image set, and may determine a pixel value of the minimum map based on the minimum value. In an example, in FIG. 6, corresponding difference values located at (1, 1) are "1", "0" and "6". Among "1", "0" and "6", "0" may be selected as a minimum value. In another example, corresponding difference values located at (2, 2) are "25", "33" and "30". Among "25", "33" and "30", "25" may be selected as a minimum value. As described above, a minimum value may be selected among corresponding difference values, and a pixel of the minimum map based on the minimum value.

The pixel value of the minimum map may correspond to a minimum value, or an index of a difference image including the minimum value among the difference images. A minimum map including minimum values may be referred to as a "minimum value map", and a minimum map including minimum indices may be referred to as a "minimum index map". In the above example, "0" may be selected as a minimum value at (1, 1) and an index of a difference image including "0" may be "1". Thus, a pixel value at (1, 1) is "0"

in the minimum value map, and a pixel value at (1, 1) is "1" in the minimum index map. Also, "25" may be selected as a minimum value at (2, 2), and an index of a difference image including "25" may be "0". Thus, a pixel value at (2, 2) is "25" in the minimum value map, and a pixel value at (2, 2) is "0" in the minimum index map.

As described above, a difference image set of each phase image may be generated. When phase images associated with a plurality of directions are present as in the examples of FIGS. 7A and 7B, a minimum map of each of the phase images may be generated based on a difference image set of each of the phase images. For example, in the example of FIG. 7A, a minimum map of each of the XN-th phase image and the YN-th phase image may be generated. In the example of FIG. 7B, a minimum map of each of the XN-th phase image, the YN-th phase image and the ZN-th phase image may be generated.

Figure 8:
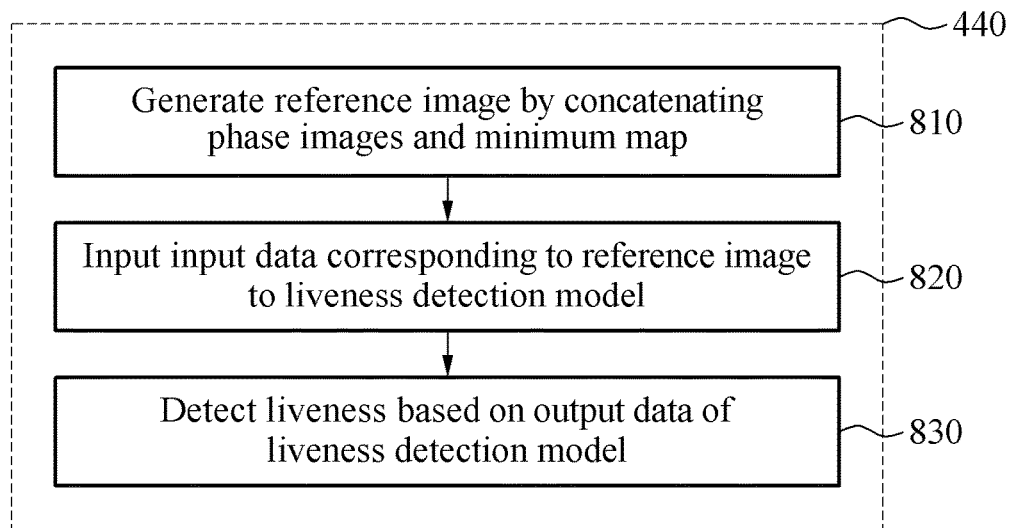
FIG. 8 illustrates an example of detecting a liveness using reference information and a liveness detection model.

FIG. 8 illustrates an example of operation 440 of FIG. 4, that is, an operation of detecting a liveness using reference information and a liveness detection model. Referring to FIG. 8, in operation 810, a liveness detection apparatus generates a reference image by concatenating phase images and a minimum map. The concatenating may correspond to an example of a combination. Hereinafter, examples of generating a reference image is further described with reference to FIG. 9.

Figure 9:
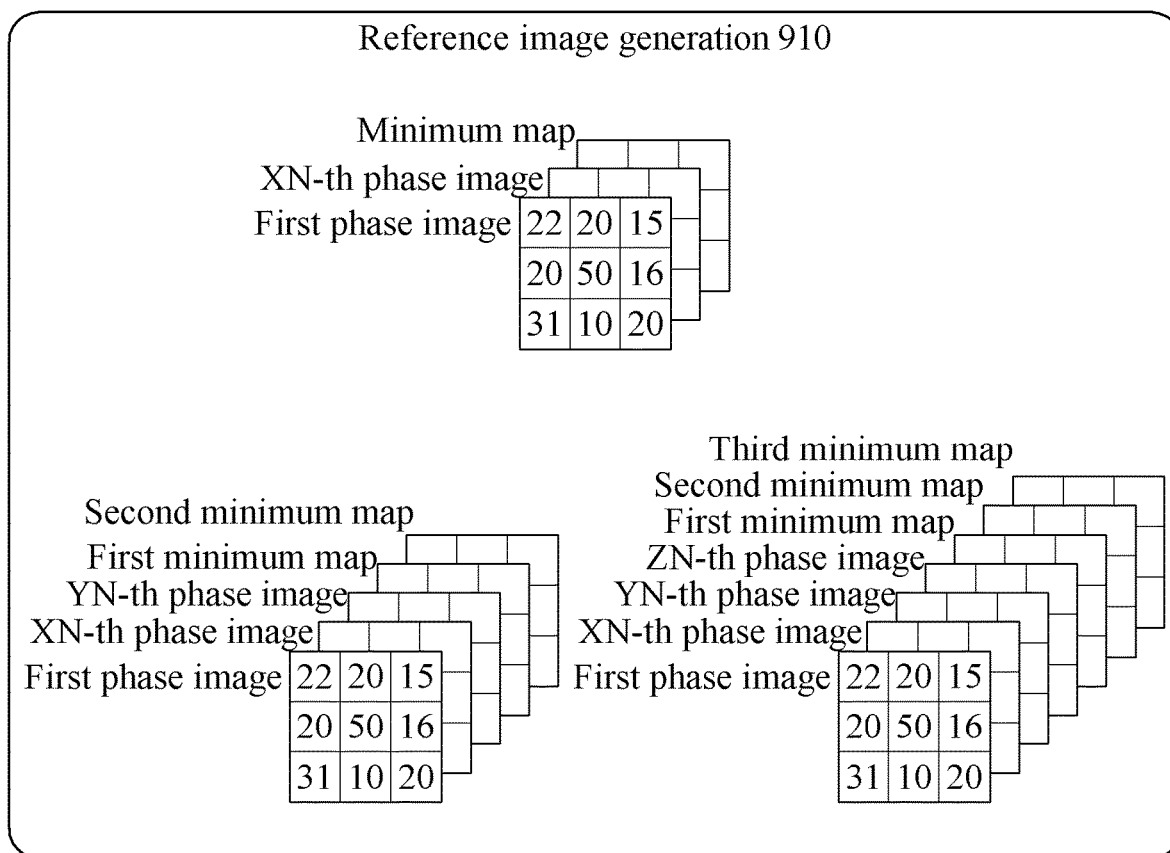
FIG. 9 illustrates an example of generating a reference image.

FIG. 9 illustrates an example of generating a reference image. Referring to FIG. 9, when phase characteristics are distinguished in a horizontal direction, a reference image may be generated by concatenating a first phase image, an XN-th phase image (for example, a second phase image) and a minimum map. To fit a size of each image, an image of a first base region may be used instead of the first phase image, and an image of a second base region may be used instead of the XN-th phase image.

When phase characteristics are distinguished in both a horizontal direction and a vertical direction, an additional phase image and an additional minimum map may be further concatenated. For example, in the example of FIG. 7A, a reference image may be generated by concatenating the first phase image, the XN-th phase image, the YN-th phase image, a first minimum map and a second minimum map. In the example of FIG. 7B, a reference image may be generated by further concatenating the ZN-th phase image and a third minimum map. The first minimum map may be generated based on the first phase image and the XN-th phase image, and the second minimum map may be generated based on the first phase image and the YN-th phase image. Also, the third minimum map may be generated based on the first phase image and the ZN-th phase image.

Also, to fit a size of each image, the image of the first base region may be used instead of the first phase image, the image of the second base region may be used instead of the XN-th phase image, an image of a third base region may be used instead of the YN-th phase image, and an image of a fourth base region may be used instead of the ZN-th phase image. The image of the third base region may represent a region corresponding to the first base region in the YN-th phase image, and the image of the fourth base region may represent a region corresponding to the first base region in the ZN-th phase image.

Referring back to FIG. 8, in operation 820, the liveness detection apparatus inputs input data corresponding to the reference image to a liveness detection model. For example, the input data may correspond to the reference image, or correspond to an image obtained by cropping the reference image. The reference image may be cropped in various versions based on an ROI.

For example, the ROI may correspond to a face box. In this example, a crop image corresponding to the face box may be represented by 1t, and a crop image corresponding to m times the face box may be represented by m*t (for example, 2t in case of a crop image corresponding to two times the face box). A full-size reference image may be represented by "reduced". In an example, input data may include the crop images 1t and 2t and the reference image reduced. Examples of a liveness detection model will be further described below with reference to FIGS. 10 and 11.

In operation 830, the liveness detection apparatus detects a liveness based on output data of the liveness detection model. The output data may include a liveness score. The liveness detection apparatus may compare the liveness score to a predetermined threshold, to detect a liveness of an object. A detection result may indicate whether the object corresponds to a real user or corresponds to an attacker such as an image acquired by capturing a user.

Figure 10:
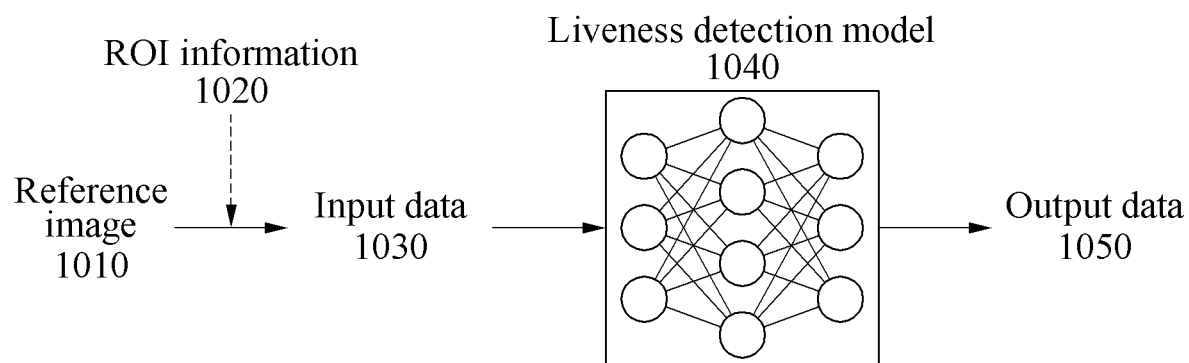
FIG. 10 illustrates an example of generating output data using a liveness detection model.

FIG. 10 illustrates an example of generating output data using a liveness detection model. Referring to FIG. 10, the liveness detection model generates input data 1030 based on a reference image 1010 and ROI information 1020. ROI information may include information about a face box and may be generated by a face detector. The liveness detection model may generate a patch by cropping the reference image 1010 based on the ROI information 1020. The input data 1030 may include a patch. When the reference image 1010 includes a plurality of concatenated images, a liveness detection apparatus may generate patches by cropping each of the images based on ROI information and may generate the input data 1030 by concatenating the patches.

A liveness detection model 1040 may include at least one neural network, and the at least one neural network may be pre-trained to detect a liveness of an object include din input data. Training data may include input data and a label. In an example, when the input data corresponds to a real user, the label may have a relatively high liveness score. When the input data corresponds to an attacker such as an image, the label may have a relatively low liveness score. The neural network may be trained based on the above training data to output a liveness score of the input data. FIG. 10 illustrates a state in which training of the liveness detection model 1040 is completed.

The liveness detection apparatus may input the input data 1030 to the liveness detection model 1040. In response to an input of the input data 1030, the liveness detection model 1040 may output output data 1050. The output data 1050 may include a liveness score. The liveness detection apparatus may detect a liveness of an object by comparing the liveness score to a predetermined threshold.

Figure 11:
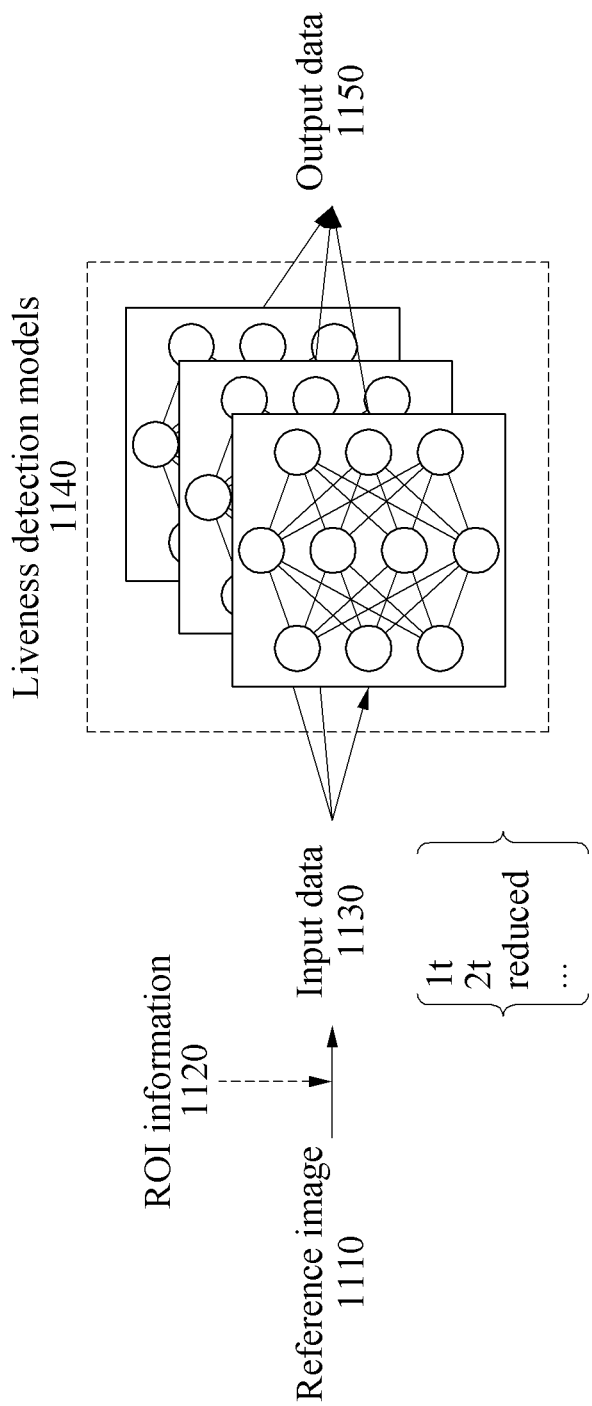
FIG. 11 illustrates an example of generating output data using a plurality of liveness detection models.

FIG. 11 illustrates an example of generating output data using a plurality of liveness detection models. Referring to FIG. 11, a liveness detection model generates input data 1130 based on a reference image 1110 and ROI information 1120. ROI information may include information about a face box. The liveness detection model may generate a plurality of patches (for example, patches 1t, 2t and reduced) by cropping the reference image 1110 based on the ROI information 1120.

For example, the liveness detection model may generate the patch 1t corresponding to the face box and the patch 2t expanded two times the face box. The patch reduced may represent the full size of the reference image 1110. A patch (may be denoted by 3t) expanded three times the face box may also be used instead of the patch reduced. The patches 1*t*, 2*t* and reduced may include different characteristics of the object. For example, the patch 1*t* may include a characteristic of a face, the patch 2*t* may include a characteristic of a portion around the face, and the patch reduced may include a characteristic associated with a background or context. The input data 1130 may include the plurality of patches.

Liveness detection models 1140 may output output data 1150 associated with each patch in response to an input of the input data 1130. For example, the liveness detection models 1140 may include a first liveness detection model, a second liveness detection model, and a third liveness detection model. The first liveness detection model may output output data 1150 associated with the patch 1*t*, the second liveness detection model may output output data 1150 associated with the patch 2*t*, and the third liveness detection model may output output data 1150 associated with the patch reduced.

The output data 1150 may include a liveness score associated with each patch. A liveness detection apparatus may perform a statistical operation (for example, an average operation) based on a liveness score associated with each patch, may compare an operation result to a predetermined threshold, and may detect a liveness of an object. Also, the description provided with reference to FIG. 10 is applicable to the example of FIG. 11.

Figure 12A:
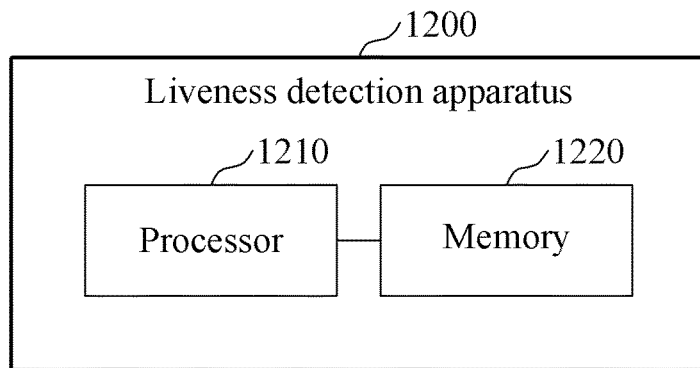
FIGS. 12A and 12B are block diagrams illustrating examples of a liveness detection apparatus.

FIG. 12A is a block diagram illustrating an example of a liveness detection apparatus 1200. Referring to FIG. 12A, the liveness detection apparatus 1200 includes a processor 1210 and a memory 1220. The memory 1220 is connected to the processor 1210 and may store instructions executable by the processor 1210, data to be processed by the processor 1210, or data processed by the processor 1210. The memory 1220 may include, for example, a non-transitory computer-readable storage medium, for example, a high-speed random access memory (RAM) and/or a non-volatile computer-readable storage medium (for example, at least one disk storage device, a flash memory device or other non-volatile solid state memory devices).

The processor 1210 may execute instructions to perform at least one of the operations described above with reference to FIGS. 1 through 11. For example, the processor 1210 may generate a first phase image based on first visual information of a first phase sensed by a first pixel group of an image sensor, may generate a second phase image based on second visual information of a second phase sensed by a second pixel group of the image sensor, may generate a minimum map based on a disparity between the first phase image and the second phase image, and may detect a liveness based on the minimum map.

Figure 12B:
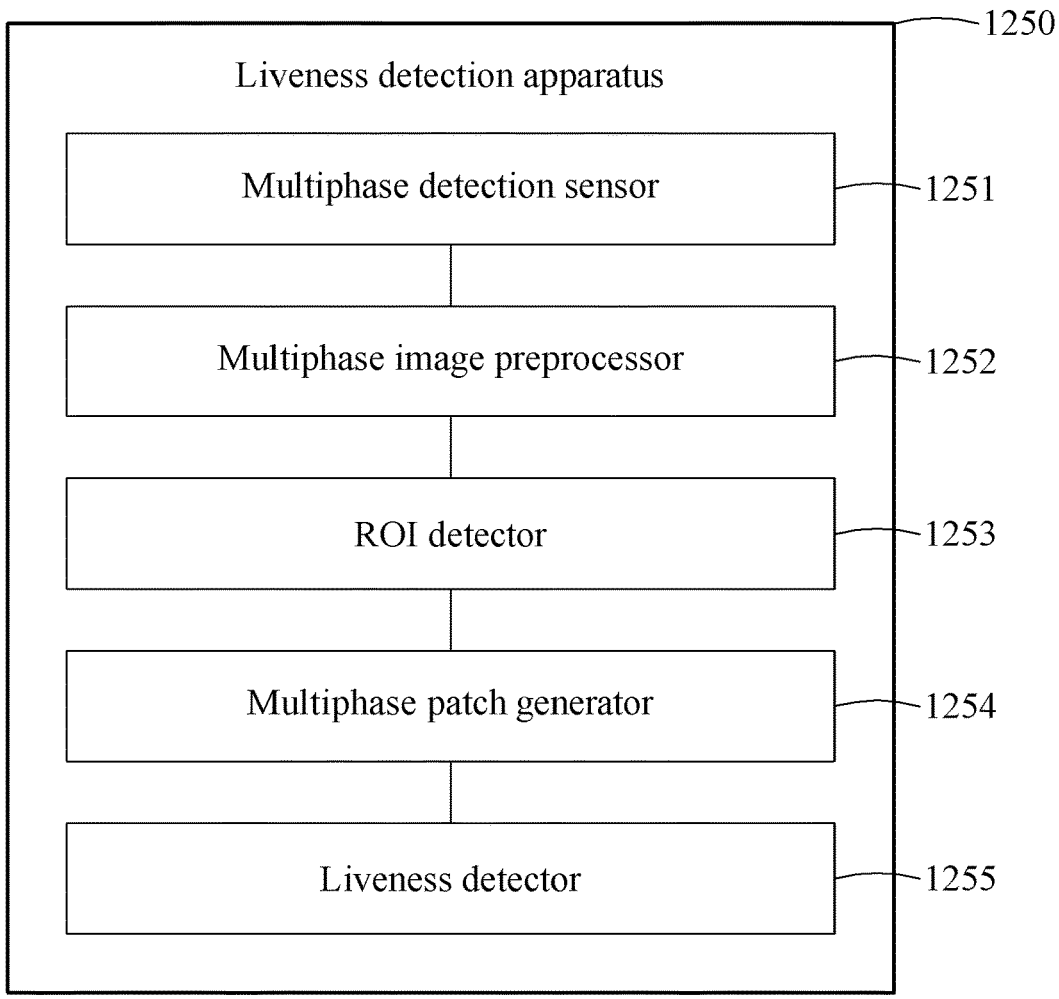

FIG. 12B is a block diagram illustrating an example of a liveness detection apparatus 1250. Referring to FIG. 12B, the liveness detection apparatus 1250 includes a multiphase detection sensor 1251, a multiphase image preprocessor 1252, an ROI detector 1253, a multiphase patch generator 1254, and a liveness detector 1255. The multiphase detection sensor 1251, the multiphase image preprocessor 1252, the ROI detector 1253, the multiphase patch generator 1254, and the liveness detector 1255 may be implemented as at least one hardware module, at least one software module, and/or a combination thereof.

Operations related to a liveness detection will be described below in terms of each of the multiphase detection sensor 1251, the multiphase image preprocessor 1252, the ROI detector 1253, the multiphase patch generator 1254, and the liveness detector 1255, however, the operations do not need to be performed by separated components, such as the multiphase detection sensor 1251, the multiphase image preprocessor 1252, the ROI detector 1253, the multiphase patch generator 1254, and the liveness detector 1255. For example, an operation described as being performed by one component may be performed by another component, or the above operations may be performed by a single integrated component, for example, the liveness detection apparatus 1250.

The multiphase detection sensor 1251 may sense visual information of a plurality of phases and may generate sensor data associated with visual information of each of the phases. For example, the multiphase detection sensor 1251 may be a 2PD sensor for sensing two types of phases, a QPD sensor for sensing four types of phases, or a sensor for sensing various types of phases. The multiphase detection sensor 1251 may sense visual information having different phase characteristics using sensing pixels that are located adjacent to each other, and may generate sensor data based on the sensed visual information. Based on the sensor data, phase images corresponding to each phase characteristic may be generated.

The multiphase image preprocessor 1252 may perform preprocessing of phase images. For example, the multiphase image preprocessor 1252 may perform preprocessing including any one or any combination of downsizing, lens shading correction, gamma correction, histogram matching, and denoising. In an example, the multiphase image preprocessor 1252 may not perform preprocessing such as distortion correction. This is because a shape of an object may desirably be preserved to detect a fine disparity, but preprocessing such as distortion correction may change the shape of the object.

The ROI detector 1253 may detect an ROI in phase images. For example, the ROI may correspond to a face box in each of the phase images. The ROI detector 1253 may specify the ROI based on coordinate information and/or size information. In an example, phase images may be resized to fit an input size of the ROI detector 1253 and may be input to the ROI detector 1253.

The multiphase patch generator 1254 may generate a minimum map based on phase images (for example, phase images to which preprocessing is applied) and may generate a reference image based on the minimum map. For example, the multiphase patch generator 1254 may shift at least one time at least one of the phase images in a state of fixing one of the other phase images, and may generate at least one minimum map based on a difference between the fixed image and the shifted image. The multiphase patch generator 1254 may generate a reference image by concatenating the phase images and the at least one minimum map.

The multiphase patch generator 1254 may generate at least one patch by cropping the reference image based on the ROI. The at least one patch may be used to generate input image of the liveness detector 1255. For example, the multiphase patch generator 1254 may generate a patch 1*t* corresponding to a face box and a patch 2*t* expanded two times the face box, by cropping the reference image based on the ROI. Also, the multiphase patch generator 1254 may prepare a patch reduced corresponding to the full size of the reference image. The multiphase patch generator 1254 may generate input data based on the patches 1*t*, 2*t* and reduced. For example, the multiphase patch generator 1254 may concatenate each patch and may perform resizing to fit an input size of the liveness detector 1255.

The liveness detector 1255 may detect a liveness of an object based on the input data. For example, the liveness detector 1255 may include at least one neural network that is pre-trained to detect a liveness of an object in input data. The at least one neural network may output output data including a liveness score in response to an input of the input data. The liveness detector 1255 may compare the liveness score to a threshold to detect the liveness of the object.

Figure 13:
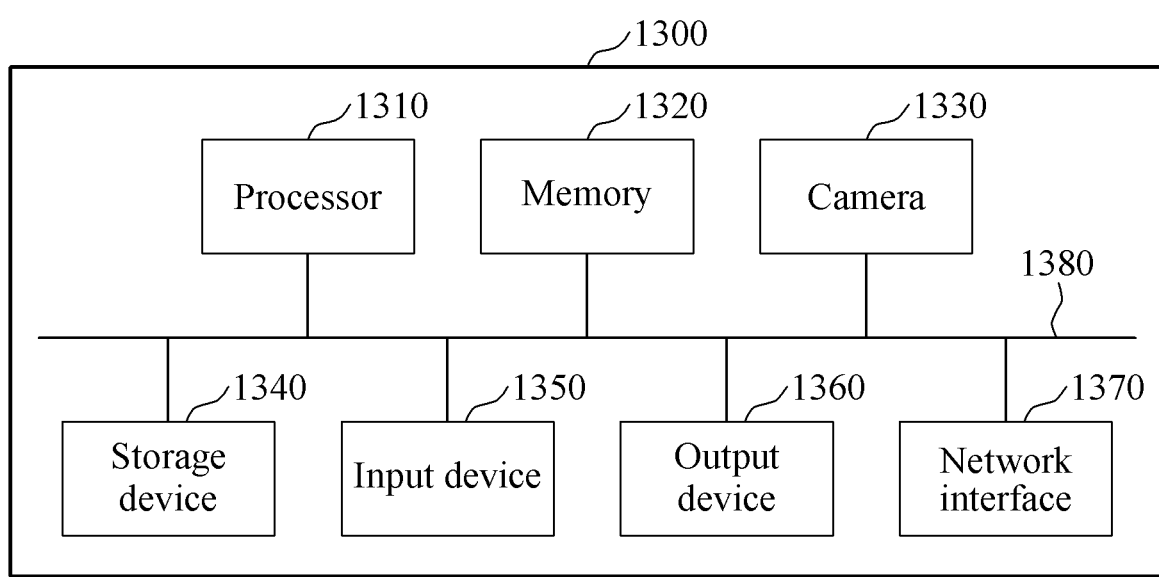
FIG. 13 is a block diagram illustrating an example of an electronic apparatus.

FIG. 13 is a block diagram illustrating an example of an electronic apparatus 1300. Referring to FIG. 13, the electronic apparatus 1300 may generate an input image including an object and may detect a liveness of the object in the input image. Also, the electronic apparatus 1300 may perform biometric authentication (for example, image-based biometric authentication such as face authentication or iris authentication) based on the liveness of the object. The electronic apparatus 1300 may structurally or functionally include the liveness detection apparatus 100 of FIG. 1, the liveness detection apparatus 1200 of FIG. 12A, and/or the liveness detection apparatus 1250 of FIG. 12B.

The electronic apparatus 1300 includes a processor 1310, a memory 1320, a camera 1330, a storage device 1340, an input device 1350, an output device 1360, and a network interface 1370. The processor 1310, the memory 1320, the camera 1330, the storage device 1340, the input device 1350, the output device 1360, and the network interface 1370 may communicate with each other via a communication bus 1380. For example, the electronic apparatus 1300 may be implemented as at least a portion of, for example, a mobile device such as a mobile phone, a smartphone, a personal digital assistant (PDA), a netbook, a tablet computer or a laptop computer, a wearable device such as a smartwatch, a smart band or smart glasses, a computing device such as a desktop or a server, home appliances such as a television (TV), a smart TV or a refrigerator, a security device such as a door lock, or a vehicle such as a smart vehicle.

The processor 1310 may execute instructions and functions in the electronic apparatus 1300. For example, the processor 1310 may process instructions stored in the memory 1320 or the storage device 1340. The processor 1310 may perform at least one of the operations described above with reference to FIGS. 1 through 12B.

The memory 1320 may store data for detection of a liveness. The memory 1320 may include a non-transitory computer-readable storage medium or a non-transitory computer-readable storage device. The memory 1320 may store instructions that are to be executed by the processor 1310, and also store information associated with software and/or applications when the software and/or applications are being executed by the electronic apparatus 1300.

The camera 1330 may capture a still image, video, or both. For example, the camera 1330 may capture a facial image including a face of a user. In an example, the camera 1330 may provide a 3D image including depth information of objects. The camera 1330 may include an image sensor (for example, a 2PD sensor or a QPD sensor) that detects multiple phases.

The storage device 1340 may include a non-transitory computer-readable storage medium or a non-transitory computer-readable storage device. The storage device 1340 may store data or various models used in a liveness detection process such as a liveness detection model or a face detector. In an example, the storage device 1340 may store a greater amount of information than that of the memory 1320 for a relatively long period of time. For example, the storage device 1340 may include magnetic hard disks, optical disks, flash memories, floppy disks or other forms of non-volatile memories known in the art.

The input device 1350 may receive an input from a user through a traditional input scheme using a keyboard and a mouse, and through a new input scheme such as a touch input, a voice input or an image input. For example, the input device 1350 may detect an input from a keyboard, a mouse, a touchscreen, a microphone or a user, and may include any other device configured to transfer the detected input to the electronic apparatus 1300.

The output device 1360 may provide a user with an output of the electronic apparatus 1300 through a visual channel, an auditory channel, or a tactile channel. The output device 1360 may include, for example, a display, a touchscreen, a speaker, a vibration generator, or other devices configured to provide a user with an output. The network interface 1370 communicates with an external device via a wired or wireless network.

The apparatuses, units, modules, devices, and other components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A liveness detection method based on a phase difference, the liveness detection method comprising:
    generating a first phase image based on first visual information of a first phase sensed by a first pixel group of a multiphase detection sensor;
    generating a second phase image based on second visual information of a second phase sensed by a second pixel group of the multiphase detection sensor; and
    detecting a liveness based on a disparity between the first phase image and the second phase image.

2. The liveness detection method of claim 1, further comprises:
    generating a minimum map based on the disparity between the first phase image and the second phase image.

3. The liveness detection method of claim 2, wherein the generating of the minimum map comprises:
    setting a first base region in the first phase image;
    setting a second base region corresponding to the first base region in the second phase image;
    setting at least one shifted region by shifting the second base region by a reference shift value;
    generating difference images based on a difference between an image of the first base region and an image of the second base region and a difference between the image of the first base region and at least one image of the at least one shifted region; and
    generating the minimum map based on the difference images.

4. The liveness detection method of claim 3, wherein the generating of the minimum map based on the difference images comprises:
    selecting a minimum value among corresponding difference values at positions that correspond to each other in the difference images; and
    determining a pixel value of the minimum map based on the minimum value.

5. The liveness detection method of claim 4, wherein the pixel value of the minimum map corresponds to the minimum value or corresponds to an index of a difference image including the minimum value among the difference images.

6. The liveness detection method of claim 1, wherein the detecting of the liveness comprises:
    inputting input data including at least one patch that is based on the disparity to the at least one liveness detection model; and
    detecting the liveness based on an output of the at least one liveness detection model,
    wherein the at least one liveness detection model comprises at least one neural network, and wherein the at least one neural network is pre-trained to detect a liveness of an object in input data.

7. The liveness detection method of claim 6, further comprising:
generating a reference image based on the first phase image, the second phase image and the disparity,
wherein the detecting of the liveness further comprises generating the at least one patch by cropping the reference image based on a region of interest (ROI).

8. The liveness detection method of claim 7, wherein
the at least one patch comprises a plurality of patches with different characteristics of the object,
the at least one liveness detection model comprises a plurality of liveness detection models that process input data comprising the plurality of patches, and
the detecting of the liveness based on the output of the at least one liveness detection model comprises detecting the liveness by fusing outputs of the plurality of liveness detection models in response to an input of the input data.

9. The liveness detection method of claim 1, further comprising:
generating a reference image based on the first phase image, the second phase image and the disparity,
wherein the detecting of the liveness comprises detecting the liveness based on the reference image.

10. The liveness detection method of claim 1, further comprising:
performing preprocessing of the first phase image and the second phase image,
wherein the performing of the preprocessing comprises applying any one or any combination of downsizing, lens shading correction, gamma correction, histogram matching, and denoising to the first phase image and the second phase image.

11. The liveness detection method of claim 1, further comprising:
generating a third phase image based on third visual information of a third phase sensed by a third pixel group of the multiphase detection sensor; and
generating a fourth phase image based on fourth visual information of a fourth phase sensed by a fourth pixel group of the multiphase detection sensor,
wherein when a minimum map is generated based on the disparity between the first phase image and the second phase image, a disparity between the first phase image and the third phase image and a disparity between the first phase image and the fourth phase image may be used.

12. A non-transitory computer-readable storage medium storing instructions that, when executed by a processor, cause the processor to perform the liveness detection method of claim 1.

13. A liveness detection apparatus based on a phase difference, the liveness detection apparatus comprising:
a processor; and
a memory comprising instructions executable by the processor,
wherein in response to the instructions being executed by the processor, the processor is configured to:
generate a first phase image based on first visual information of a first phase sensed by a first pixel group of a multiphase detection sensor;
generate a second phase image based on second visual information of a second phase sensed by a second pixel group of the multiphase detection sensor; and
detect a liveness based on a disparity between the first phase image and the second phase image.

14. The liveness detection apparatus of claim 13, wherein the processor is configured to:
set a first base region in the first phase image;
set a second base region corresponding to the first base region in the second phase image;
set at least one shifted region by shifting the second base region by a reference shift value;
generate difference images based on a difference between an image of the first base region and an image of the second base region and a difference between the image of the first base region and at least one image of the at least one shifted region; and
generate a minimum map based on the difference images.

15. The liveness detection apparatus of claim 14, wherein the processor is configured to select a minimum value among corresponding difference values at positions that correspond to each other in the difference images and to determine a pixel value of the minimum map based on the minimum value.

16. The liveness detection apparatus of claim 13, wherein the processor is configured to generate a reference image based on the first phase image, the second phase image and the disparity and to detect the liveness based on the reference image.

17. The liveness detection apparatus of claim 13, wherein a first pixel of the first pixel group and a second pixel of the second pixel group are located adjacent to each other.

18. An electronic apparatus comprising:
a multiphase detection sensor configured to sense first visual information of a first phase using a first pixel group and to sense second visual information of a second phase using a second pixel group; and
a processor configured to generate a first phase image based on the first visual information, to generate a second phase image based on the second visual information, and to detect a liveness based on a disparity between the first phase image and the second phase image.

19. The electronic apparatus of claim 18, wherein the processor is configured to:
set a first base region in the first phase image;
set a second base region corresponding to the first base region in the second phase image;
set at least one shifted region by shifting the second base region by a reference shift value;
generate difference images based on a difference between an image of the first base region and an image of the second base region and a difference between the image of the first base region and at least one image of the at least one shifted region; and
generate a minimum map based on the difference images.

20. The electronic apparatus of claim 19, wherein the processor is configured to select a minimum value among corresponding difference values at positions that correspond to each other in the difference images and to determine a pixel value of the minimum map based on the minimum value.

* * * * *